United States Patent [19]
Lancelot et al.

[11] Patent Number: 6,026,086
[45] Date of Patent: Feb. 15, 2000

[54] APPARATUS, SYSTEM AND METHOD FOR A UNIFIED CIRCUIT SWITCHED AND PACKET-BASED COMMUNICATIONS SYSTEM ARCHITECTURE WITH NETWORK INTERWORKING FUNCTIONALITY

[75] Inventors: Robert W. Lancelot, Barrington; Douglas J. Newlin, Geneva, both of Ill.

[73] Assignee: Motorola, Inc., Schaumburg, Ill.

[21] Appl. No.: 08/780,516

[22] Filed: Jan. 8, 1997

[51] Int. Cl.[7] .................................................. H04L 12/64
[52] U.S. Cl. ........................... 370/353; 370/401; 370/466
[58] Field of Search .................................... 370/352, 353, 370/354, 401, 402, 465, 466, 467

[56] References Cited

U.S. PATENT DOCUMENTS

| | | | |
|---|---|---|---|
| 5,208,811 | 5/1993 | Kashio et al. | 370/401 |
| 5,347,516 | 9/1994 | Yoshida | 370/401 |
| 5,724,355 | 3/1998 | Bruno et al. | 370/401 |
| 5,729,544 | 3/1998 | Lev et al. | 370/353 |
| 5,809,233 | 9/1998 | Shur | 370/402 |
| 5,828,666 | 10/1998 | Focsaneanu et al. | 370/389 |

*Primary Examiner*—Min Jung
*Attorney, Agent, or Firm*—Romi N. Bose

[57] ABSTRACT

An apparatus (105), system (100) and method is provided for a unified circuit switched and packet-based communications system architecture having network interworking functionality. The apparatus (105) includes a circuit switched network interface (130), with the circuit switched network interface coupleable to a network switch (135) for communication of a circuit switched network protocol signal with a circuit switched network (160); a packet-based network interface (140), the packet-based network interface coupleable to a router (115) for communication of a packet-based network protocol signal with a packet-based network (150); a transceiver (120) coupleable to the communications channel (103) for the transmission and reception of a first protocol signal; and a communications controller (145), the communications controller coupled to the circuit switched network interface, to the packet-based network interface and to the transceiver, the communications controller responsive, through a set of program instructions and an interworking function, to interconvert the first protocol signal with the circuit switched network protocol signal and to interconvert the first protocol signal with the packet-based network protocol signal.

46 Claims, 5 Drawing Sheets

APPARATUS, SYSTEM AND METHOD FOR A UNIFIED CIRCUIT SWITCHED AND PACKET-BASED COMMUNICATIONS SYSTEM ARCHITECTURE WITH NETWORK INTERWORKING FUNCTIONALITY

FIELD OF THE INVENTION

This invention relates, in general, to telecommunications and data communications and, more specifically, to an apparatus, system and method for a unified circuit switched and packet-based communications system architecture with network interworking functionality.

BACKGROUND OF THE INVENTION

With the advent of multimedia communications, telecommunications and data communications have become increasingly complex. For example, multimedia communications applications such as real time transmission of digitally encoded video, voice, and other forms of data, may require new forms and systems for such data communications and telecommunications. One such new communications system is the CableComm system currently being developed by Motorola, Inc. In the CableComm system, a hybrid optical fiber and coaxial cable ("HFC") is utilized to provide substantial bandwidth over existing cable lines to secondary stations or devices such as individual, subscriber access units connected to one or more telephones, videophones, and/or a personal computers, workstations, other data terminal equipment ("DTE"), for example, in households having new or preexisting cable television capability. These coaxial cables are further connected via fiber optical cables to a central location having centralized, primary (or "head end") controllers or stations having receiving and transmitting capability. Such primary equipment may be connected to any variety of networks or other information sources, from the Internet, various on line services, telephone networks, to video/movie subscriber services. With the CableComm system, digital data, voice, video, and other multimedia data may be transmitted both in the downstream direction, from the primary station or controller (connected to a network) to the secondary station of an individual user (subscriber access unit), and in the upstream direction, from the secondary station to the primary station (and to a network). As discussed in greater detail below, the topology of such a communications system may be described as having a primary node (such as one formed by a primary station), connected via an intermediate network to many secondary nodes (such as those formed by secondary stations), which are then connected to corresponding terminals (forming a secondary network).

Such current systems have typically evolved to have separate voice telecommunications systems and separate data communications systems over the same HFC or other cable network. For example, in the CableComm system, separate and distinct secondary stations and primary stations are utilized for voice telecommunications through a circuit switched telecommunications network such as the public switched telephone network ("PSTN"), and separate and distinct secondary stations and primary stations are utilized for data communications through packet-based (or packet switched) communications networks, such as Internet Protocol ("IP") networks. Such separate systems have evolved because, for example, the dedicated bandwidth of circuit switched systems is typically preferable for time or delay sensitive applications, such as in real time voice and video communications in which any time delay is noticeable and may be a source of user irritation. Conversely, such dedicated bandwidth for real time communications may be inefficient for many data applications, such as electronic mail, in which such time delay may be immaterial. As a consequence, data communications systems have typically provided for asynchronous and often bursty data communications over a shared, non-dedicated bandwidth medium, such as an Ethernet or other packet-based system.

While such separate circuit switched and packet-based systems may be very efficient and effective for their separate purposes, other inefficiencies are introduced through, for example, duplication of the equipment and devices required for establishing, operating and maintaining separate systems. Such duplicative equipment typically has also been proprietary, with equipment designed for one system unable to communicate over another system. Accordingly, a need has remained for a unified circuit switched and packet-based communications system architecture, which may avoid duplication of equipment, but which nonetheless provides for efficient multimedia communications such as voice, video, and data communications. In addition, such a system architecture should also provide interworking between disparate systems, such that standardized and non-proprietary equipment may also be utilized.

DETAILED DESCRIPTION OF THE INVENTION

As mentioned above, a need has remained for a unified circuit switched and packet-based communications system architecture, which may avoid duplication of equipment, and which nonetheless provides for efficient multimedia communications such as voice, video, and data communications. The present invention provides for an apparatus, method and system for a unified circuit switched and packet-based communications system. In addition, in accordance with the invention, the unified circuit switched and packet-based communications system also provides interworking between disparate systems, such that standardized and non-proprietary equipment may also be utilized.

Figure 1:
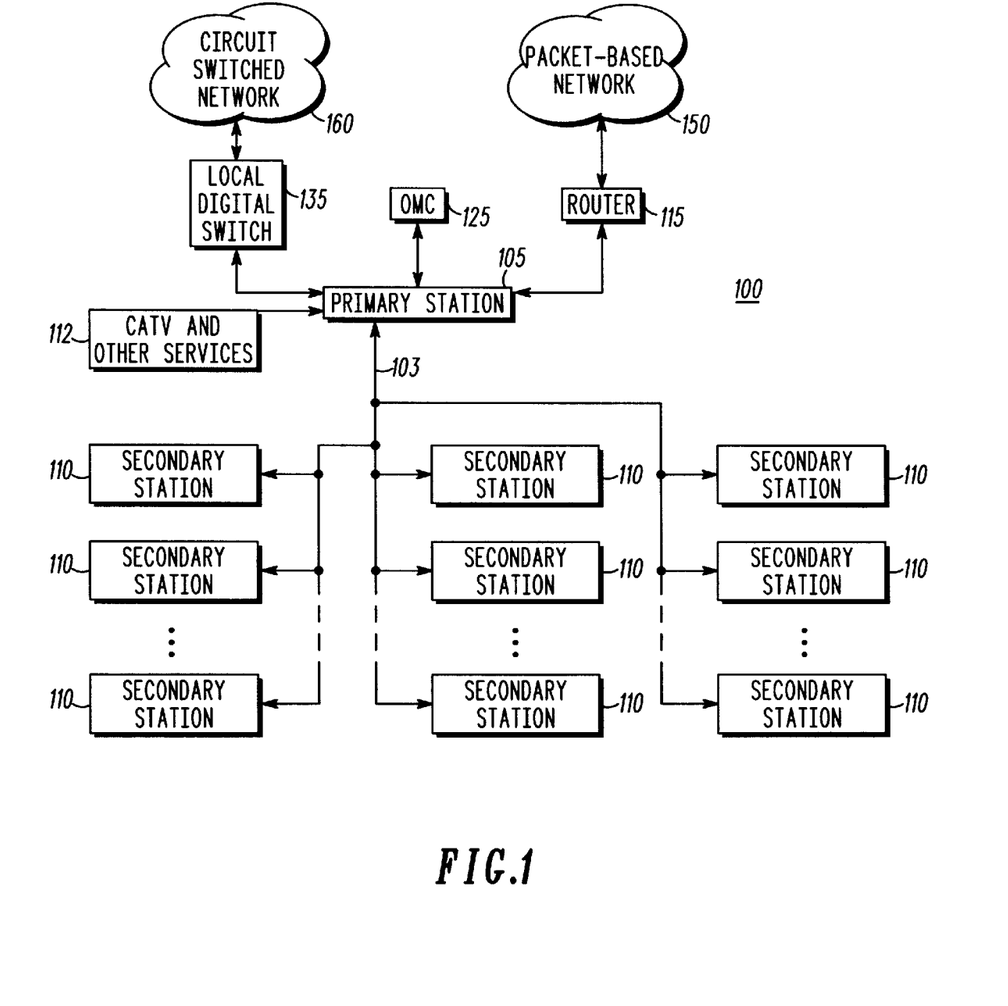
FIG. 1 is a block diagram illustrating a unified circuit switched and packet-based communications system architecture in accordance with the present invention.

FIG. 1 is a block diagram illustrating an unified circuit switched and packet-based communications system (or system architecture) 100 in accordance with the present invention. The unified circuit switched and packet-based communications system 100 consists of a primary station (or device) 105 coupled through a communications channel 103 to one or more secondary stations 110, with the primary station 105 coupled (or coupleable) to a first network 160 (which is preferably a circuit switched network), via a network switch 135 (also referred to as a local digital switch 135), and to a second network 150 (which is preferably a packet-based or Internet Protocol ("IP") network), via a router 115. The local digital switch 135 and the router 115, in the preferred embodiment, are standard or otherwise non-proprietary, such that duplication of equipment between circuit switched and packet-based networks may be avoided. The unified circuit switched and packet-based communications system 100 provides communications services such as telephony, video conferencing, data networking and transmission, enterprise networking and telemetry, utilizing the networks 160 and 150, and provisioning for other services, such as cable television ("CATV") and other services, utilizing CATV and other services infrastructure 112. The primary station 105, described in greater detail below with reference to FIG. 2, preferably is a shared (or trunked) device in a central location and provides services to many subscribers or other users. The secondary stations 110, described in greater detail below with reference to FIG. 3, preferably are located within or about a user's premises, and may be coupled to telephones, personal computers, video displays, video cameras, multimedia equipment, and so on. In the preferred embodiment, the communications channel 103 is hybrid fiber coaxial cable ("HFC"), capable of high capacity (or high bandwidth) data communications which may occur between the various secondary stations 110 and one of the networks 160 or 150. The first or circuit switched network 160, for example, may be a public switched telephone network ("PSTN") or an Integrated Services Digital Network ("ISDN"), or any combination of such existing or future telecommunications networks. The second or packet-based network 150, for example, may be the Internet, a local area network ("LAN"), or a wide area network ("WAN"), or another form of Intranet. The unified circuit switched and packet-based communications system 100 preferably includes an operations and maintenance center ("OMC") 125, which provides operations, administration, maintenance and provisioning functionality for the unified circuit switched and packet-based communications system 100, such as system monitoring, alarm and fault detection, traffic measurement, load balancing, billing and customer information services.

As discussed in greater detail below, communication between the primary station 105 and the secondary stations 110 occurs utilizing a first protocol (or modulation mode), such as the CACS protocol (discussed below) utilized in the preferred embodiment or another time division multiple access ("TDMA") protocol. At the primary station 105, any information or signal transmitted to or from a secondary station 110 (utilizing the first protocol) is converted, utilizing an appropriate interworking function, into a second protocol signal, such as a signal having a form suitable for transmission over a particular network type, such as an analog signal suitable for transmission over the PSTN of the circuit switched network 160, an ISDN protocol signal for transmission over an ISDN network of the circuit switched network 160, or an IP packet signal for transmission over a packet-based network 150. The only requirement for the type of first protocol utilized between the primary station 105 and the secondary stations 110 is that the first protocol should have sufficient capacity to interface, in real time, with other protocols which may be used by the various networks 160 or 150, such as ISDN, T1 or E1 protocols operating at bit rates of 64 kbps, 128 kbps, 1.54 Mbps, 2.048 Mbps, or more. Preferably, the first protocol should also provide for trunking or sharing of applicable channels (also preferred to as multiple access), to provide high efficiency data transmission for both circuit switched (or dedicated bandwidth) transmissions and for packet-based (bursty or variable bandwidth) transmissions. As a consequence, while the preferred first protocol is the CACS protocol discussed below, those skilled in the art will recognize that innumerable other equivalent protocols and modulation modes also may be utilized.

Figure 2:
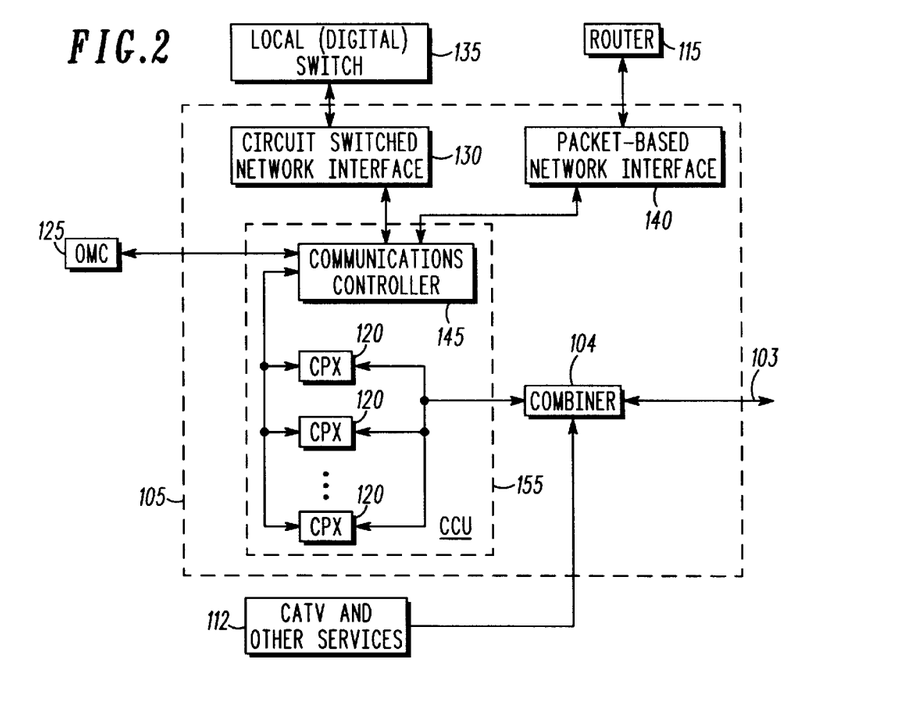
FIG. 2 is a block diagram illustrating a primary station in accordance with the present invention.

FIG. 2 is a block diagram illustrating a primary station 105 in accordance with the present invention. A primary station 105, also referred to as head end equipment, includes a control unit referred to in the preferred embodiment as a cable control unit ("CCU") 155, a first network interface 130, also referred to as a circuit switched network interface (or telecommunications network interface, such as a T1 or E1 interface), and a second network interface 140, also referred to as a packet-based network interface. The primary station 105 may also include a combiner 104 which is coupleable to the CATV video services infrastructure 112. The CCU 155 consists of a communications controller 145 and a transceiver 120 or preferably a bank of transceivers 120, also referred to as cable port transceiver ("CPX") cards in the preferred embodiment. The communications controller 145 is preferably a form of a processor arrangement, discussed in greater detail below. The communications controller 145 transmits and receives circuit switched network (or other industry) standard signals, such as time division multiplexed ("TDM") digital signals, via the first network interface 130 (preferably a circuit switched network interface), to and from a local digital switch ("LDS") 135, which in turn connects to the rest of the first (circuit switched) network 160 (illustrated in FIG. 1). The communications controller 145 also transmits and receives IP (or other industry) standard packet-based signals such as Internet packets, frame relay packets, X.25 packets, ATM (asynchronous transfer mode) packets, via the second (packet-based) network interface 140, to and from a router 115 which connects to the rest of the second (packet-based) network 150 (illustrated in FIG. 1). In the preferred embodiment, incoming (received) signals to the communications controller 145 are converted to an internal signaling format such as a first protocol format, may also have TDM time slots interchanged, and are then routed to the transceivers 120. The transceivers 120 convert the received signals to frequencies (e.g., radio frequencies ("RF")) suitable for the communications channel 103 and the first protocol, such as radio frequencies compatible with cable television (CATV) networks. Conversely, the transceivers 120 also receive first protocol signals transmitted from secondary stations 110 via the communications channel 103, demodulate those signals, and with the communications controller 145, convert those first protocol signals to a form suitable for transmission over one of the networks 160 or 150. As discussed in greater detail below, the primary station 105 provides concentration of the resources of the networks 160 and 150 through time slot and frequency management techniques.

In the preferred embodiment, as mentioned above, the signaling over the unified circuit switched and packet-based communications system 100 (via the communications channel 103) uses a first protocol referred to as "CACS" (for Cable ACcess Signaling), for transmission and reception of data such as voice, video, computer files and programs, multimedia applications, and other information (collectively referred to as data). CACS is a multi-layered protocol consisting of a plurality of 768 kbps $\pi/4$-DQPSK (differential quadrature phase shift keying) modulated RF carriers using TDM framing in the downstream path (from the primary station 105 to a secondary station 110) and TDMA (time division multiple access) in the upstream path (to the primary station 105 from a secondary station 110). In the preferred embodiment, each CACS carrier (carrier frequency or center frequency) supports as many as eight time slots of individually addressable user data packets, in which each packet contains 160 bits of user data (the "payload") plus synchronization, address and error correction information. The preferred CACS frame rate is 400 frames per second, providing a net user data throughput of 64 kbps (kilobits per second) for each assigned time slot. Time slots also may be concatenated or otherwise combined to provide even greater data rates, for example, up to 512 kbps per carrier when all eight time slots of an RF carrier are assigned to a single user, or higher data rates when additional RF carriers are utilized.

As a consequence, N×64 kbps services may be supported with the CACS protocol, where N is the number of assigned time slots. In the case of connectivity for ordinary telephony commonly known as POTS (Plain Old Telephone Service), a single time slot is used in which digital PCM (pulse code modulated) audio samples are transported in the payload of the CACS time slot. In the case of connectivity for higher rate services, such as basic rate ISDN (two 64 kbps B channels plus one 16 kbps D channel), two or more time slots are used to transport the user (bearer) data. For video conferencing and telephony service, compressed digital audio and video signals may occupy from one to multiple time slots per carrier (e.g., 8 time slots per carrier), depending on the method of compression used and the desired quality of the service.

Also in the preferred embodiment, modulated CACS RF carriers occupy an RF bandwidth of 600 kHz and may be assigned anywhere within the downstream and upstream frequency bands of the service provider. For example, in domestic, North American CATV systems, the downstream band has been designated from 50 to 750 MHz, with an upstream band designated from 5 to 40 MHz. Referring to FIG. 2, for transmission to secondary stations 110 at user premises, the transceivers 120 receive a TDM data stream from the communications controller 145 and create CACS frames of eight time slots, along with associated overhead signaling information (including error control data), resulting in a 768 kbps data stream. The data stream is then converted to a $\pi/4$-DQPSK signal, which in turn is then upconverted in frequency from baseband to an RF carrier within the CATV downstream band (or other downstream band suitable for use on an HFC or other communications medium). This $\pi/4$-DQPSK signal may then be optionally combined (in the combiner 104 of the primary station 105) with other signals (such as video) from the CATV and other services infrastructure 112, and transmitted over the communications channel 103.

At the receiving end, as discussed in greater detail below, a secondary station 110 downconverts the CACS carrier to baseband and demodulates the $\pi/4$-DQPSK signal, resulting in received CACS frames. Time slot information (i.e., the data in the payload) is then extracted from the CACS frames and transferred to an audio codec in the case of telephony (a POTS call), or transferred to an audio/video compression and decompression subsystem in the case of a video conferencing call or session, or transferred to a processor arrangement or subsystem in the case of other data transmissions. Conversely, for upstream transmission, voice, video or other data originating, respectively, from an audio codec, or an audio/video compression and decompression subsystem, or a processor arrangement, is put into CACS protocol formatted TDMA data packets. The TDMA data packets are then converted into a $\pi/4$-DQPSK signal, upconverted to an RF carrier, and injected into the upstream path of the unified circuit switched and packet-based communications system 100, on communications channel 103. In turn, one of the transceivers 120 receives the upstream signal from a secondary station 110, RF downconverts the signal to baseband and demodulates the $\pi/4$-DQPSK signal, resulting in a received TDMA data packet. The user data is then extracted from the packet and transferred to the communications controller 145, which utilizes an interworking function and reformats the user data into an appropriate network signal (analog or digital), generally referred to as a second protocol signal, and, through the circuit switched network interface 130 or packet-based network interface 140, transmits the second protocol signal to the circuit switched network 160 (via the local digital switch 135) or to the packet-based network 150 (via the router 115).

In the preferred embodiment, the CACS protocol consists of three types of signaling channels which use designated time slots on CACS carriers. A first type of signaling channel, referred to as a broadcast channel, is utilized to transmit general system information, only in the downstream direction to the various secondary stations 110, and to transmit information such as terminating alerts to a secondary station 110 when a call or other information is to be received from the network 160 or 150. A plurality of a second type of signaling channel, referred to as access channels, are used by the various secondary stations 110 to gain access to the unified circuit switched and packet-based communications system 100 (or the networks 160 or 150). A plurality of a third type of signaling channel, referred to as traffic channels, are full-duplex and are used to transport user data to and from the networks 160 and 150.

In the preferred embodiment, traffic channels may consist of one or more time slots and are assigned to users based on demand (trunked or bonded (bandwidth on demand)) from a pool of available time slots. A traffic channel is assigned for the duration of a call (POTS, ISDN, video, multimedia or other data), and upon call termination, is subsequently released to the pool of available time slots. When a secondary station 110 first powers up, it registers with the CCU 155 by first scanning the downstream spectrum for a CACS broadcast channel, synchronizing with that channel, and obtaining information concerning a location of an access channel. On the access channel, the secondary station 110 requests an assignment of a traffic channel, and then transmits a registration message over the assigned traffic channel of the plurality of traffic channels. After registration is complete, the secondary station 110 may communicate through the networks 160 or 150.

If a call origination or other data transmission is required, the secondary station 110 makes a request to the CCU 155 for the required number of time slots through the access channel. The CCU 155 then grants the request and assigns a traffic channel (carrier frequency and associated time slot(s)). If a call or data packet delivery is required, the CCU 155 alerts the identified, addessed secondary station 110 of an incoming call or data packet over the broadcast channel. Via the access channel, the secondary station 110 then requests a traffic channel. The CCU 155 grants the request and a traffic channel is assigned.

In the preferred embodiment, the CACS protocol also provides the capability for transferring calls to other available carrier frequencies and time slots, especially in the event of high noise conditions. Preferably, the quality of all user traffic channels is continuously monitored, and if the quality starts to degrade due to noise, the call is transferred to another RF carrier having less noise.

Figure 3:
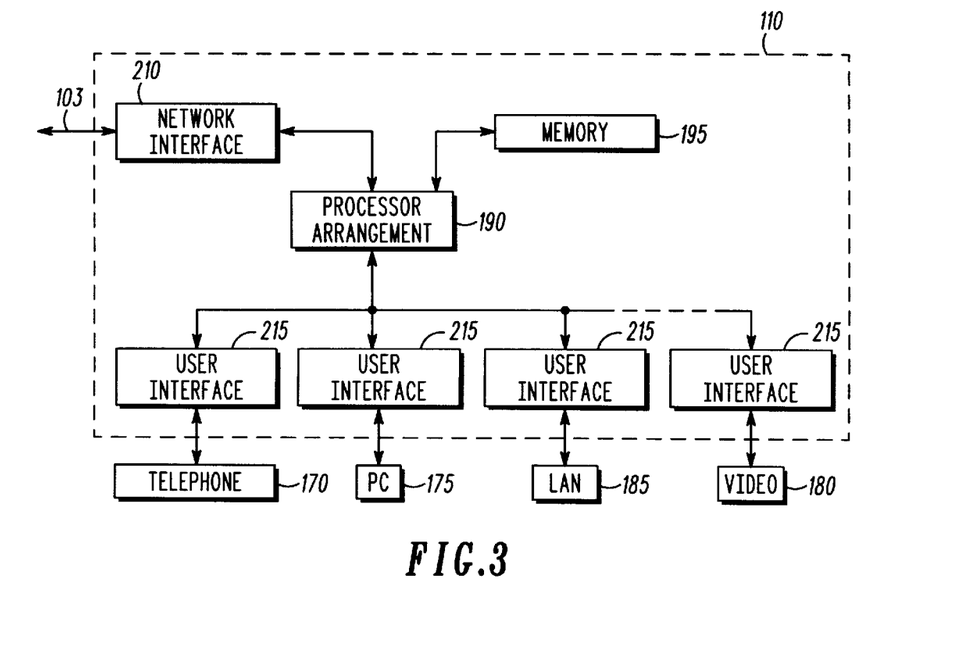
FIG. 3 is a block diagram illustrating a secondary station in accordance with the present invention.

FIG. 3 is a block diagram illustrating a secondary station 110 in accordance with the present invention. The secondary station 110 includes a network interface 210, one or more user interfaces 215, a processor arrangement 190, and preferably a memory 195. The network interface 210 is coupleable to the communications channel 103 for reception of a first protocol signal, such as a π/4-DQPSK TDM signal, to form a received protocol signal; and for transmission of a first protocol signal, such as digital data in a TDMA format, to form a transmitted protocol signal, such as a π/4-DQPSK TDMA signal. These various protocol signals may also utilize protocols and modulation types (collectively referred to as protocols) other than those utilized within the CACS protocol such as, for example, more general PSK (phase shift keying) or QPSK (quadrature phase shift keying) modulation methods, OFDM (orthogonal frequency division multiplexing), QAM (quadrature amplitude modulation), H.320, H.323, or H.324.

Continuing to refer to FIG. 3, one or more user interfaces 215 are utilized for various purposes, such as providing connectivity or interfacing with a telephone 170, a personal computer ("PC") 175, a video display 180, or a LAN (local area network) 185 (such as Ethernet, ATM, or electric power line LANs for home automation and telemetry). In the preferred embodiment, one of the user interfaces 215 is also utilized for reception of a control signal of a plurality of control signals, such as a request to place a telephony call, a request to place an audio and video conference call, and other control signals such as alerting signals of incoming telephony or audio and video conference calls. The processor arrangement 190 is coupled to the network interface 210, to the memory 195, and to one or more user interfaces 215. As explained in greater detail below, the processor arrangement 190 (and the communications controller 145) may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement (and communications controller) should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or $E^2$PROM. As discussed in greater detail below, the methodology of the invention may be programmed and stored, as a set of program instructions for subsequent execution, in the communications controller 145 (with its associated memory) and in the processor arrangement 190 with its associated memory (or in memory 195) and other equivalent components. In the preferred embodiment, as discussed in greater detail below, the communications controller 145 is responsive, through a set of program instructions and an interworking function, to interconvert a first protocol signal with a circuit switched network protocol signal and to interconvert a first protocol signal with a packet-based network protocol signal. Such conversion between these various protocol signals is referred to herein as interconversion, to imply bi-directional conversion between the various protocols, e.g., conversion of a first protocol signal to a circuit switched network protocol signal for messages to be sent to the circuit switched network 160 and conversion of a circuit switched network protocol signal to a first protocol signal for messages to be sent from the circuit switched network 160.

Figure 4:
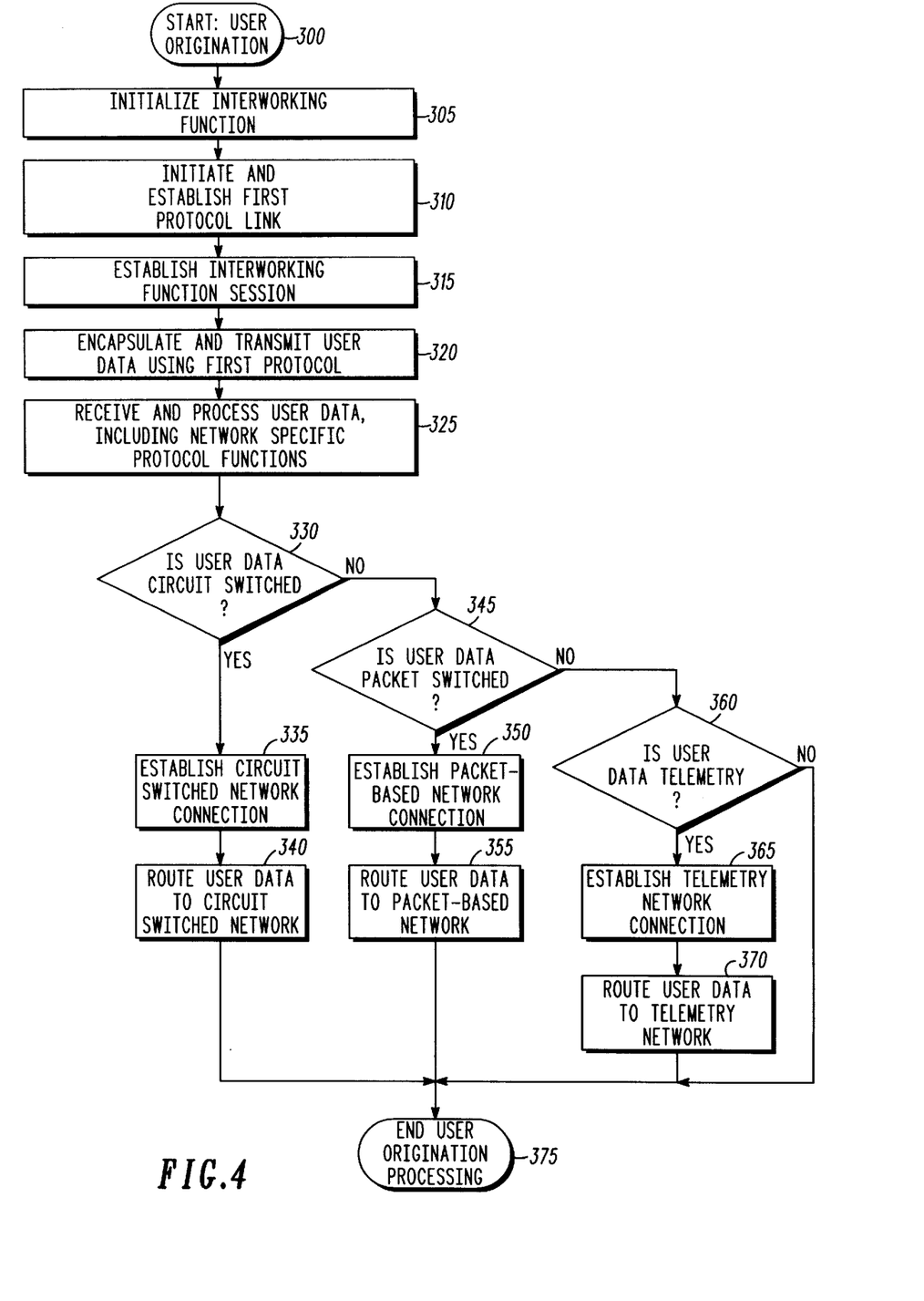
FIG. 4 is a flow diagram illustrating a method for a unified circuit switched and packet-based communications system in accordance with the present invention.

As discussed above, for information received by the primary station 105 from either the circuit switched network 160 (via the circuit switched network interface 130) or the packet-based network 150 (via the packet-based network interface 140), the primary station 105 will convert that received information into a first protocol signal for transmission to a secondary station 110 via the communications channel 103. Conversely, user originated information, namely, information received by the primary station 105 in the form of a first protocol signal from a secondary station 110, must be converted into a second protocol signal suitable for transmission via one of the networks 160 or 150. FIG. 4 is a flow diagram illustrating a method for a unified circuit switched and packet-based communications system, for processing user originated information, in accordance with the present invention. The method begins, start step 300, with user origination (via one of the user interfaces 215 in a secondary station 110), such as a telephone 170 going off hook or a PC initiating a packet data transmission. Next, in step 305, an interworking function is initialized (preferably within the processor arrangement 190 and/or communications controller 145), and in step 310, a first protocol link is initiated and a communication session established with the primary station 105 utilizing, for example, the CACS protocol discussed above. In step 315, an interworking function session is established with the primary station 105, and in step 320, user data (which also may be encapsulated) is transmitted to the primary station 105 using the first protocol. In the preferred embodiment utilizing the CACS protocol, voice, video, or other data or bearer information for subsequent transmission over a circuit switched network is not encapsulated and is transmitted directly as network layer one information within the payload portion of a CACS frame. Non-bearer information, such as ISDN D channel or other out-of-band signaling information, call control, call set up, and signaling information, is transmitted within the CACS payload in an encapsulated format, such as a MOS__INFO message of the CACS protocol, which is used to indicate (and thereby inform the primary station 105) that the information which follows or is encapsulated is information of a certain type, such as signaling or call control information. Next, in step 325, the primary station 105 receives (via transceivers 120) and processes (via communications controller 145) the user data, determining what type (circuit, packet or telemetry) of information is being transmitted, and also performing network specific protocol functions, such as Q.931 signaling. In step 330, when the user data is circuit switched, the primary station 105 establishes a circuit switched network connection, step 335, and routes the user data to the circuit switched network (until the call is terminated), step 340. In step 345, when the user data is packet-based, the primary station 105 establishes a packet-based network connection, step 350, and routes the user data to the packet-based network (until all data is transmitted), step 355. Similarly, in step 360, when the user data is telemetry, the primary station 105 establishes a telemetry network connection, step 365, and routes the user data to the telemetry network (until all telemetry data is transmitted), step 370. Telemetry (such as electronic meter reading, alarm and other utility information), may also be viewed as a type or special case of packet data utilizing a packet based network, steps 345, 350 and 355. Following steps 340, 355 or 370, user originated data processing may end, step 375.

As illustrated above, any network specific functionality is implemented solely within the primary station 105, and any secondary station 110 does not require, and in the preferred embodiment does not have, any particular or specific network functionality. A secondary station 110 need only have first protocol functionality for communications with the primary station 105. As a consequence, the secondary station 110 may be considered to provide bridging (and routing) of user data between the secondary station 110 and the primary station 105, while the primary station 105 may be considered to provide translation of user data between the first protocol and any network specific protocol. As a consequence, network functionality is concentrated in a shared or trunked resource in a central, head end location, resulting in equipment savings and the ability for significant upgrades independently of user equipment. For example, implementation of ATM may be made directly and virtually instantaneously in a primary station 105, without any servicing of second stations 110 distributed at myriad user locations.

In the preferred embodiment, the CACS protocol is used as the first protocol to provide these bridging functions and to enable a primary station to provide corresponding translation functions (through interworking functionality). A CACS message (layer 1) frame contains a header portion having synchronization and address information, a payload portion having user data and other messages, followed by error control information. CACS layer 2 framing information provides data link control, such that information is delivered intact and in the correct sequence. CACS layer 3 information is contained within the payload portion, and consists of data or signaling messages. As discussed in greater detail below, such layer 3 information (in a CACS payload) is transformed by the primary station 105, utilizing a higher level interworking function, into network or protocol specific messages, information or packets. In addition, for certain functions such as ordinary (POTS) telephony or ISDN B (bearer) channel information, the primary station performs such interworking functions directly at network layer 1. Conversely, also utilizing an interworking function, a primary station 105 also converts network specific information, such as ISDN D channel signaling information, into first protocol information for transmission to a secondary station 110, such as CACS protocol signaling information transmitted in a CACS frame. In the preferred embodiment, a CACS layer 3 message or instruction type, such as a MOS_INFO statement in the payload portion of a CACS message, is utilized for interworking functionality and for call control and signaling, for example, for the primary station to convert subsequent (encapsulated) packet data into an ISDN format or to establish a particular network connection (call establishment, control and signaling). In the preferred embodiment, the MOS_INFO message may be as long as 269 bytes, with the first byte indicating the message type (MOS_INFO), the second byte indicating the existence of encapsulated data, the third byte indicating the length of user data, the fourth byte indicating the type of network protocol (such as ISDN primary rate or basic rate, ATM, Ethernet) for interworking functionality to be performed by the primary station 105, and bytes five and subsequent bytes containing the user data. The fourth byte indicating the desired network protocol may be automatically determined by a secondary station 110 in the preferred embodiment, based upon which or what type of user interface 215 is originating the service request, e.g., an Ethernet user interface connected to a PC. In the preferred embodiment, following call establishment, for circuit switched networks such as the PSTN (POTS) or ISDN, most information is directly transmitted within a CACS payload, with only D channel or other Q.931 signaling information being encapsulated within a MOS_INFO statement. Also in the preferred embodiment, for packet-based networks, packet data is transmitted in an encapsulated form within the payload of a CACS frame.

Figure 5:
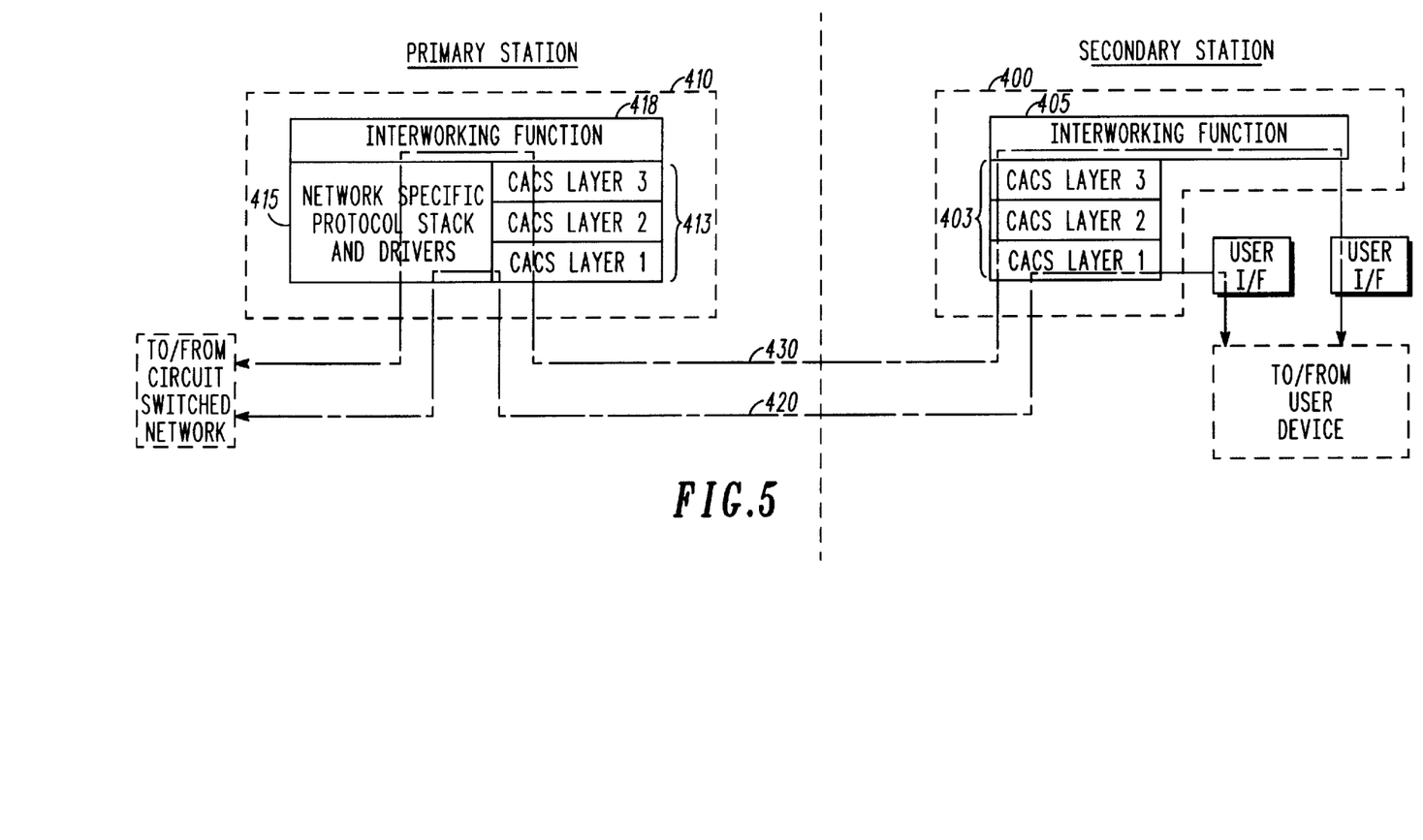
FIG. 5 is a block diagram illustrating interworking functionality and protocol layers for circuit switched communications in accordance with the present invention.

FIG. 5 is a block diagram illustrating interworking functionality and protocol layers for circuit switched communications in accordance with the present invention. As illustrated in FIG. 5, a secondary station protocol stack 400, implementing the first protocol stack 403 (layers one through three) and having basic or primitive interworking functionality 405, is implemented within a secondary station. A primary station protocol stack 410, implementing the first protocol stack 413 (layers one through three), implementing a network specific protocol stack and drivers 415, and having complete interworking functionality 418, is implemented within a primary station. The network specific protocol stack and drivers 415 may be for any circuit switched network such as ISDN, POTS (PSTN), T1, E1, and so on. As indicated above and as illustrated in FIG. 5, for circuit switched network connections such as PSTN (POTS) or ISDN, information transmitted between a primary station and a secondary station may follow either of two paths within these protocol stacks 400 and 410. Virtually all POTS (PSTN) information, including call set up (such as DTMF signaling), is implemented in layer 1 interworking functionality, illustrated as path 420. Similarly, all ISDN bearer information (B channel) is also implemented in layer 1 interworking functionality (path 420). ISDN call establishment, call control, call tear down, billing information, and other Q.931 or other D channel signaling, is implemented utilizing the complete protocol stacks 400 and 410, including the higher level interworking functionality 405 and 418, illustrated as path 430, with the interworking functionality 418 providing translation between ISDN signaling and call control, on the circuit switched network side, and the first protocol, on the secondary station side. For example, for path 420 (layer 1), the primary station 105 will pull out the payload of a CACS frame from the appropriate N×64 time slot, and insert that information directly into the assigned or given DS0 of ISDN PRI, providing layer one interworking. ISDN signaling information, however, is out of band and, as a consequence, the primary station 105 will translate a CACS signaling message (encapsulated within a MOS_INFO message), utilizing interworking functionality 418, into the appropriate ISDN signaling, and insert the ISDN signaling bits into the appropriate D channel, and vice-versa. In addition, the interworking functionality 418 may also be designed to set up and utilize an ISDN D channel, without set up of any B channels, for transmission of X.25 packet data.

Figure 6:
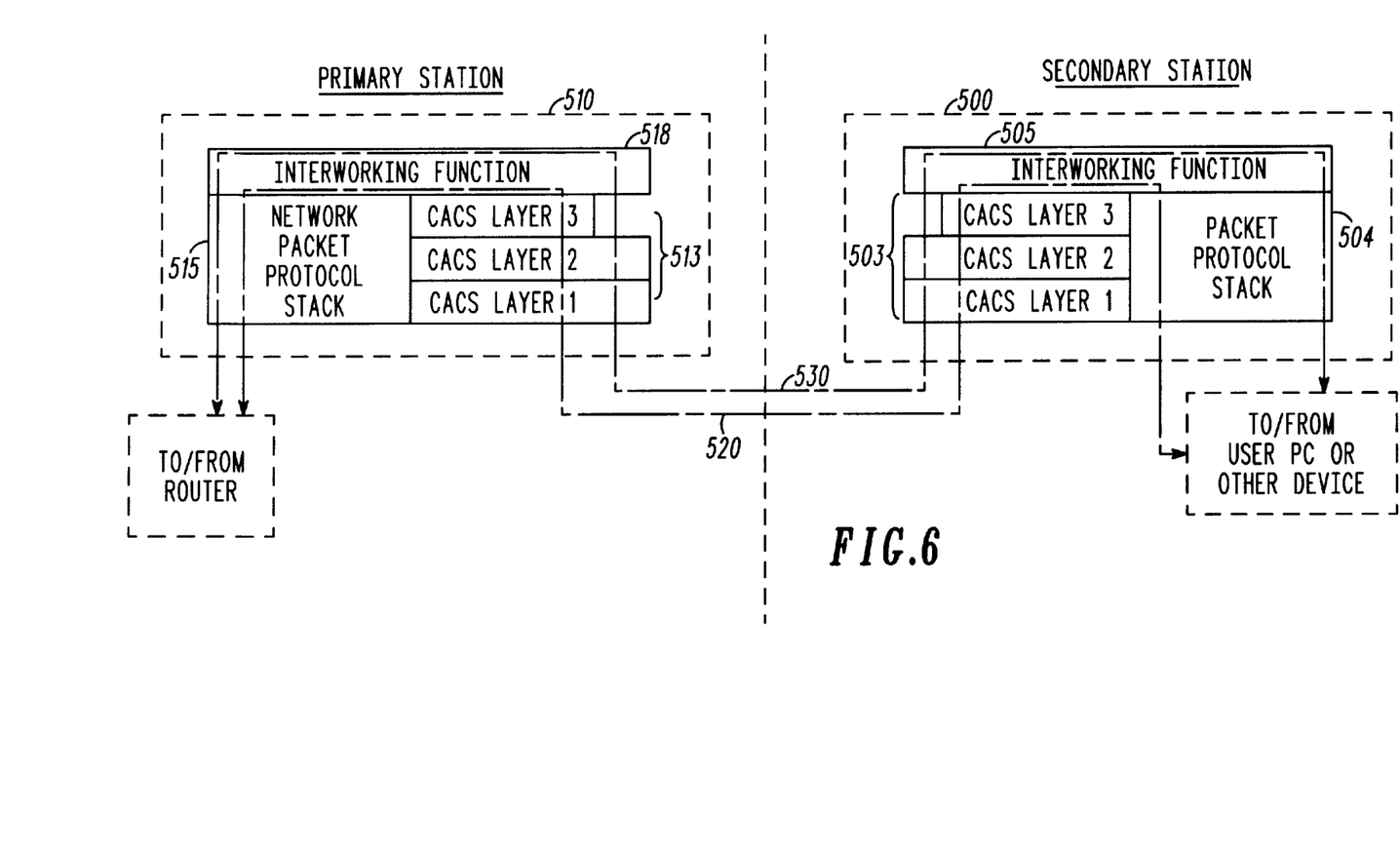
FIG. 6 is a block diagram illustrating interworking functionality and protocol layers for packet-based communications in accordance with the present invention.

FIG. 6 is a block diagram illustrating interworking functionality and protocol layers for packet-based communications in accordance with the present invention. As illustrated in FIG. 6, a secondary station protocol stack 500, implementing the first protocol stack 503 (layers one through three), a packet protocol stack 504 (such as an Ethernet stack), and having interworking functionality 505, is implemented within a secondary station. A primary station protocol stack 510, implementing the first protocol stack 513 (layers one through three), implementing a network packet protocol stack and drivers 515, and having complete interworking functionality 518, is implemented within a primary station. Path 520 is followed when establishing a first protocol communication session between a secondary station 110 and a primary station 105, such as establishing a CACS protocol connection, in which the primary station 105 utilizes the CACS layer 3 protocol for signaling and other aspects of time slot and carrier frequency assignment of the CACS protocol. Once a first protocol session is established, such as allocating one or more time slots, path 530 is followed for packet data transmission. Additional (rather than primitive) interworking functionality 505 is utilized at the secondary station, for example, to determine whether the IP data packet is destined for an address outside of any attached local area network. The interworking functionality 505 is also utilized by the secondary station to determine whether a first protocol session is needed (or is already established), as multiple, independent packets (going to different addresses) may be transmitted during the same first protocol communication session. The interworking functionalities 505 and 518, in the preferred embodiment, also provide for segmentation and reassembly of data packets, for example, between the maximum 20 bytes of data in a CACS protocol frame and 1500 bytes or more for Ethernet or token ring data packets. The interworking functionality 518 also provides reverse address resolution protocol (RARP) functionality, for the primary station 105 to provide appropriate media access control (MAC) layer responses to any connected router 115, and also to determine whether a packet from a first secondary station 110 is destined for another, second secondary station 110 also connected to the same primary station 105. In addition, the interworking functionality 518 also provides appropriate translation of IP addresses (of inbound or incoming data packets) to corresponding addresses of secondary stations 110.

In summary, FIGS. 1–6 disclose, among other things, an apparatus (primary station 105) for a unified circuit switched and packet-based communications system 100, with apparatus comprising: first, a circuit switched network interface 130, the circuit switched network interface 130 coupleable to a network switch 135 for communication of a circuit switched network protocol signal with a circuit switched network 160; second, a packet-based network interface 140, the packet-based network interface 140 coupleable to a router 115 for communication of a packet-based network protocol signal with a packet-based network 150; third, a transceiver 120 coupleable to a communications channel 103 for the transmission and reception of a first protocol signal; and fourth, a communications controller 145, the communications controller 145 coupled to the circuit switched network interface 130, to the packet-based network interface 140 and to the transceiver 120, the communications controller 145 responsive, through a set of program instructions and an interworking function, to interconvert the first protocol signal with the circuit switched network protocol signal and to interconvert the first protocol signal with the packet-based network protocol signal. In addition, the communications controller 145 may be further responsive to encapsulate signaling information in the first protocol signal, to interconvert data of the first protocol signal with data of the circuit switched network protocol signal utilizing an internetworking layer one interworking function, to interconvert signaling information of the first protocol signal with signaling information of the circuit switched network protocol signal utilizing an internetworking layer three interworking function, and to interconvert packet data of the first protocol signal with packet data of the packet-based network protocol signal utilizing an internetworking layer three interworking function. Also as discussed above, the packet-based network protocol signal may be, among other things, an internet protocol data packet, an X.25 data packet, a frame relay data packet, an asynchronous transfer mode (ATM) data packet, or a telemetry data packet. Also as discussed above, the circuit switched network protocol signal may be a V.34 signal, such as for video or data, another type of analog signal, such as a voice signal, an ISDN signal, a T1 signal, or an E1 signal.

As may be apparent from the above discussion, the unified circuit switched and packet-based communications system of the present invention achieves significant integration of previously separate and distinct system architectures, melding packet-based and circuit switched communications systems into one integrated communications system. As a consequence, duplication of equipment may be avoided, providing a significant advantage to a service provider utilizing the unified circuit switched and packet-based communications system of the present invention, such as avoiding duplication of an operations and maintenance center ("OMC").

Another significant advantage of the unified circuit switched and packet-based communications system of the present invention is its ability to utilize a standard, non-proprietary router, such as router 115, in a completely new network environment, namely, a hybrid fiber coaxial network spanning an extremely large area, forming a highly distributed, extremely wide area network, and capable of high frequency operation.

Yet another significant advantage of the unified circuit switched and packet-based communications system of the present invention is the utilization of interworking functionality to provide universal bridging and translation functions, enabling interworking in any network environment such as ISDN, POTS, Internet protocol, Ethernet, X.25, ATM, and frame relay. All such network specific functionality may be concentrated in a central, head end location, enabling significant network service provision to end users without requiring specific equipment at end user premises, such as dedicated routers and ISDN terminal adapters. Such concentration of network specific functionality, with the ability to support multiple and independent communications protocols, also supports a one-to-many model of communications, such that one user may communicate with any other type of service transparently. Prior art systems would require completely different and separate systems to accomplish this result, such as an analog line for telephony and V.34 data transmission, an ISDN line for ISDN service with multilink PPP, an electric power line with power line control for telemetry, a dedicated or ISDN line for frame relay, and a coaxial line with a proprietary router for cable data transmission. The unified circuit switched and packet-based communications system of the present invention has integrated all of these disparate services into a single medium (HFC) utilizing a single carrier (such as CACS having N×64 kbps capability, utilizing a single and integrated customer or subscriber premise device (such as a secondary station 110).

Lastly, another significant advantage of the unified circuit switched and packet-based communications system of the present invention is utilization of a first protocol, such as the CACS protocol, which provides the capability for bandwidth on demand within a trunked, shared network environment, dynamically allocating bandwidth from a pool or shared resource. As a consequence, the unified circuit switched and packet-based communications system of the present invention may be considered to be a hybrid system between a circuit switched communications system, which may provide guaranteed but fixed bandwidth, and a trunked or shared communications system (such as a LAN or other packet-based system), which may provide variable but uncertain bandwidth (typically having collision and contention issues).

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for a unified circuit switched and packet-based communications system, the method comprising:

establishing a first communication session via a first protocol between a primary station having an interworking function and a secondary station over a common communication path;

establishing a second communication session between the primary station and selectively a network circuit switch or a network packet router via a network specific protocol when the network circuit switch and the network packet router are connected to the primary station;

selecting a traffic channel;

transmitting and receiving data over the selected traffic channel using the first protocol;

using the interworking function, translating signaling information between the first protocol and the network specific protocol;

using the interworking function, bridging data between the first protocol and the network specific protocol; and releasing the selected traffic channel when either the first or second communication session is terminated.

2. The method of claim 1, further comprising:

transmitting data to the network using the network specific protocol.

3. The method of claim 1, further comprising:

receiving data from the network using the network specific protocol.

4. The method of claim 1, wherein the transmitting and receiving step further comprises:

encapsulating signaling information using the first protocol.

5. The method of claim 1, wherein the transmitting and receiving step further comprises:

encapsulating packet data using the first protocol.

6. The method of claim 1 wherein the network is a circuit switched network.

7. The method of claim 1 wherein the network is a packet-based network.

8. The method of claim 1 wherein the first protocol is a time division multiple access protocol.

9. The method of claim 1 wherein the first protocol is a time division multiple access protocol having a plurality of radio frequency carriers, each radio frequency carrier of the plurality of radio frequency carriers having a plurality of time slots.

10. The method of claim 1 wherein the data bridging step further comprises:

when the network is a circuit switched network, bridging data between the first protocol and the network specific protocol, using an interworking function performing the bridging at a level of internetworking layer one.

11. The method of claim 1 wherein the data bridging step further comprises:

when the network is a packet-based network, bridging data between the first protocol and the network specific protocol, using an interworking function performing the bridging at a level of internetworking layer three.

12. An apparatus for a unified circuit switched and packet-based communications system, the apparatus comprising:

a circuit switched network interface, the circuit switched network interface coupleable to a network switch for communication of a circuit switched network protocol signal with a circuit switched network;

a packet-based network interface, the packet-based network interface coupleable to a router for communication of a packet-based network protocol signal with a packet-based network;

a transceiver coupleable to a communications channel for the transmission and reception of a first protocol signal;

a control unit having a communications controller, the communications controller coupled to the circuit switched network interface, to the packet-based network interface and to the transceiver, the communications controller responsive, through a set of program instructions and an interworking function, to selectively interconvert the first protocol signal with the circuit switched network protocol signal or the first protocol signal with the packet-based network protocol signal, the control unit for assigning from a pool of traffic channels one or more traffic channels for carrying one or more of the protocol signals.

13. The apparatus of claim 12 wherein the communications controller is further responsive to encapsulate signaling information in the first protocol signal.

14. The apparatus of claim 12 wherein the communications controller is further responsive to interconvert data of the first protocol signal with data of the circuit switched network protocol signal utilizing an internetworking layer one interworking function.

15. The apparatus of claim 12 wherein the communications controller is further responsive to interconvert signaling information of the first protocol signal with signaling information of the circuit switched network protocol signal utilizing an internetworking layer three interworking function.

16. The apparatus of claim 12 wherein the communications controller is further responsive to interconvert packet data of the first protocol signal with packet data of the packet-based network protocol signal utilizing an internetworking layer three interworking function.

17. The apparatus of claim 12 wherein the packet-based network protocol signal is an internet protocol data packet.

18. The apparatus of claim 12 wherein the packet-based network protocol signal is an X.25 data packet.

19. The apparatus of claim 12 wherein the packet-based network protocol signal is a frame relay data packet.

20. The apparatus of claim 12 wherein the packet-based network protocol signal is an asynchronous transfer mode data packet.

21. The apparatus of claim 12 wherein the packet-based network protocol signal is a telemetry data packet.

22. The apparatus of claim 12 wherein the communications channel is hybrid fiber coaxial cable.

23. The apparatus of claim 12 wherein the circuit switched network protocol signal is a V.34 signal.

24. The apparatus of claim 12 wherein the circuit switched network protocol signal is an analog signal.

25. The apparatus of claim 12 wherein the circuit switched network protocol signal is an ISDN signal.

26. The apparatus of claim 12 wherein the circuit switched network protocol signal is a T1 signal.

27. The apparatus of claim 12 wherein the circuit switched network protocol signal is an E1 signal.

28. A system for unified circuit switched and packet-based communications, the system comprising:

a plurality of secondary stations;

a primary station having a communication controller, coupled via a transceiver with a communications traffic channel to one or more of the plurality of secondary stations for the transmission and reception of a first protocol signal at a first predetermined frequency;

a circuit switched network interface, the circuit switched network interface coupleable to a network switch for communication of a circuit switched network protocol signal with a circuit switched network;

a packet based network interface, the packet-based network interface coupleable to a router for communication of a packet-based network protocol signal with a packet-based network; and the communications controller coupled to the circuit switched network interface, to the packet-based network interface and to the transceiver, the communications controller responsive, through a set of program instructions and an interworking function, to selectively interconvert the first protocol signal with the circuit switched network protocol signal or to interconvert the first protocol signal with the packet-based network protocol signal, the communications controller further enabling transmission and reception of the first protocol signal at an alternate frequency if the first predetermined frequency degrades in quality.

29. The system of claim 28 wherein the primary station is further coupled to a circuit switched network and a packet-based network.

30. The system of claim 29 wherein the primary station is responsive, through a set of program instructions and an interworking function, to interconvert the first protocol signal with a circuit switched network protocol signal and to interconvert the first protocol signal with a packet-based network protocol signal.

31. The system of claim 30 wherein the primary station is further responsive to encapsulate signaling information in the first protocol signal.

32. The system of claim 30 wherein the primary station is further responsive to interconvert data of the first protocol signal with data of the circuit switched network protocol signal utilizing an internetworking layer one interworking function.

33. The system of claim 30 wherein the primary station is further responsive to interconvert signaling information of the first protocol signal with signaling information of the circuit switched network protocol signal utilizing an internetworking layer three interworking function.

34. The system of claim 30 wherein the primary station is further responsive to interconvert packet data of the first protocol signal with packet data of the packet-based network protocol signal utilizing an internetworking layer three interworking function.

35. The system of claim 30 wherein the packet-based network protocol signal is an internet protocol data packet.

36. The system of claim 30 wherein the packet-based network protocol signal is an X.25 data packet.

37. The system of claim 30 wherein the packet-based network protocol signal is a frame relay data packet.

38. The system of claim 30 wherein the packet-based network protocol signal is an asynchronous transfer mode data packet.

39. The system of claim 30 wherein the packet-based network protocol signal is a telemetry data packet.

40. The system of claim 30 wherein the communications channel is hybrid fiber coaxial cable.

41. The system of claim 30 wherein the circuit switched network protocol signal is a V.34 signal.

42. The system of claim 30 wherein the circuit switched network protocol signal is an analog signal.

43. The system of claim 30 wherein the circuit switched network protocol signal is an ISDN signal.

44. The system of claim 30 wherein the circuit switched network protocol signal is a T1 signal.

45. The system of claim 30 wherein the circuit switched network protocol signal is an E1 signal.

46. The system of claim 30 further including a control unit for assigning from a pool of traffic channels a predetermined traffic channel for carrying the first protocol signal, the control unit for further releasing to the pool the selected predetermined traffic channel when communication between the primary station and the one or more secondary stations is terminated.

* * * * *